US009512816B2

(12) United States Patent  (10) Patent No.: US 9,512,816 B2
Ferguson  (45) Date of Patent: Dec. 6, 2016

(54) SYSTEMS AND METHODS TO GENERATE ELECTRICITY USING A THREE VANE WATER TURBINE

(75) Inventor: Frederick D. Ferguson, Chelsea (CA)

(73) Assignee: WATEROTOR ENERGY TECHNOLOGIES INC., Ottawa (CA)

(*) Notice: Subject to any disclaimer, the term of this patent is extended or adjusted under 35 U.S.C. 154(b) by 779 days.

(21) Appl. No.: 13/236,955

(22) Filed: Sep. 20, 2011

(65) Prior Publication Data
US 2013/0069372 A1  Mar. 21, 2013

(51) Int. Cl.
*F03B 13/10* (2006.01)
*F03B 7/00* (2006.01)
*F03B 17/06* (2006.01)

(52) U.S. Cl.
CPC ............ *F03B 7/003* (2013.01); *F03B 17/063* (2013.01); *F05B 2240/301* (2013.01); *Y02E 10/223* (2013.01); *Y02E 10/28* (2013.01); *Y02E 10/38* (2013.01)

(58) Field of Classification Search
CPC .... F03B 17/063; F03B 7/003; Y02E 10/223; Y02E 10/28; Y02E 10/38; F05B 2240/301
See application file for complete search history.

(56) References Cited

U.S. PATENT DOCUMENTS

| | | | | |
|---|---|---|---|---|
| 2,379,324 A | * | 6/1945 | Topalov | ......................... 415/4.2 |
| 3,912,937 A | * | 10/1975 | Lesser | ............................. 290/43 |
| 4,078,746 A | * | 3/1978 | Harris | ....................... 244/153 A |
| 4,104,536 A | * | 8/1978 | Gutsfeld | .......................... 290/54 |
| 4,156,580 A | * | 5/1979 | Pohl | .......................... F03D 3/02 |
| | | | | 290/55 |
| 4,366,936 A | * | 1/1983 | Ferguson | .......................... 244/2 |
| 4,686,376 A | * | 8/1987 | Retz | ................................. 290/42 |
| 5,038,049 A | * | 8/1991 | Kato | ..................... F03D 3/0454 |
| | | | | 290/54 |

(Continued)

FOREIGN PATENT DOCUMENTS

| | | | |
|---|---|---|---|
| EP | 1096144 A2 * | 5/2001 | .............. F03D 3/02 |
| GB | 190901602 A | 0/1909 | |

(Continued)

OTHER PUBLICATIONS

"PCT Notification of Transmittal of the International Search Report and the Written Opinion of the International Searching Authority, or the Declaration", dated Mar. 25, 2013, for International Application No. PCT/IB2012/002327, 8pgs.

*Primary Examiner* — Tulsidas C Patel
*Assistant Examiner* — S. Mikailoff
(74) *Attorney, Agent, or Firm* — Buckley, Maschoff & Talwalkar LLC

(57) ABSTRACT

According to some embodiments, a drum may be submerged in water and extend horizontally along a center axis between a first point on a first side of the drum and a second point on a second side of the drum opposite the first side. Three curved vanes may be attached to the drum such that the vanes, when acted upon by a water flow perpendicular to the axis, are operable to cause rotation about the axis, wherein an edge portion of each vane, located substantially opposite the drum, defines a plane substantially parallel to a plane defined by a surface of the drum located between the edge portion and the axis. An electrical generator coupled to the drum may convert rotational energy produced by the rotation about the axis into electrical energy.

12 Claims, 18 Drawing Sheets

(56) References Cited

U.S. PATENT DOCUMENTS

| | | | | |
|---|---|---|---|---|
| 5,430,332 A * | 7/1995 | Dunn, Jr. | | F03B 7/00 290/43 |
| 6,942,454 B2 * | 9/2005 | Ohlmann | | F03D 3/02 290/55 |
| 7,329,963 B2 * | 2/2008 | Omer | | F03B 17/066 290/43 |
| 7,347,485 B1 * | 3/2008 | Saunders | | B60J 1/20 296/180.5 |
| 8,134,246 B1 * | 3/2012 | Lois | | 290/44 |
| 8,546,966 B1 * | 10/2013 | Santos | | 290/43 |
| 2004/0047732 A1 * | 3/2004 | Sikes | | F03D 3/02 416/1 |
| 2005/0276682 A1 * | 12/2005 | Yang | | 415/4.2 |
| 2006/0251505 A1 * | 11/2006 | Ferguson | | 415/4.1 |
| 2007/0108768 A1 * | 5/2007 | Dempster | | 290/42 |
| 2009/0167027 A1 * | 7/2009 | Kato | | F03D 3/02 290/55 |
| 2009/0314353 A1 * | 12/2009 | Vasshus et al. | | 137/14 |
| 2010/0213716 A1 * | 8/2010 | Santoro | | 290/54 |
| 2010/0219635 A1 * | 9/2010 | Evans, Jr. | | F03D 3/0454 290/44 |
| 2010/0237625 A1 * | 9/2010 | Dempster | | 290/54 |
| 2010/0308590 A1 * | 12/2010 | Rohrer | | F03B 13/1815 290/53 |
| 2011/0006542 A1 * | 1/2011 | Burrell, IV | | 290/55 |
| 2011/0057442 A1 * | 3/2011 | Chauvin | | 290/43 |
| 2011/0206526 A1 * | 8/2011 | Roberts | | F03D 3/02 416/223 R |

FOREIGN PATENT DOCUMENTS

| | | |
|---|---|---|
| JP | 54-74043 | 6/1979 |
| JP | 57-206779 | 12/1982 |
| JP | 61-019978 | 1/1986 |
| JP | 62-267577 | 11/1987 |
| JP | 2004-052736 | 2/2004 |
| WO | 92/21877 A1 | 12/1992 |
| WO | 9528564 A1 | 10/1995 |
| WO | 03/058061 A1 | 7/2003 |
| WO | WO 03058061 A1 * | 7/2003 |
| WO | 2008/003868 A2 | 1/2008 |

* cited by examiner

SYSTEMS AND METHODS TO GENERATE ELECTRICITY USING A THREE VANE WATER TURBINE

TECHNICAL FIELD

The present disclosure relates generally to systems and methods for providing electrical energy generation via water power, and more particularly to systems and methods for improved water rotors and/or turbines.

BACKGROUND

The use of renewable energy resources continues to be an important factor in satisfying energy demands while substantially reducing environmental impacts. Solar, hydropower, and water resource technologies, for example, continue to decrease in cost and increase in efficiency, while practically eliminating adverse environmental effects. Many conventional renewable recourse energy generation technologies, however, require large amounts of capital and/or real estate to implement. With respect to water generation facilities, for example, typical water rotors may be expensive to build and/or may be required to be sited in fast moving water. Water rotors designed to rotate from water energy flow typically fall into two broad categories: bladed propeller or turbine type systems that convert energy using blades spinning at velocities greater than the water flow speed to achieve power, and alternatively a category of typically inefficient Savonius styled water rotors that catch the flow, at slower than water flow speeds converting energy directly as torque. A typical Savonius styled water rotor or Savonius turbine will have a Coefficient of Power ("CoP") of approximately 0.08 (or 8%), making them inefficient to use from an economic point of view. The first category "propeller-like" systems, although very efficient, require relatively fast water flow to capture energy, are relatively fragile and expensive to build in large sizes. Alternatively, a Savonius water rotor can operate in very slow water speed and is relatively inexpensive to build and operate.

Accordingly, there is a need for systems and methods for improved water rotors that address these and other problems found in existing technologies.

DETAILED DESCRIPTION

According to some embodiments, systems and methods for tethered water rotors and/or turbines are provided. Tethered water turbines that rotate about a horizontal axis in response to a normal water force may, for example, be utilized to produce electrical energy. In some embodiments, the tethered water turbines are may be at least slightly buoyant. According to some embodiments, the turbines are held more perpendicular will less lean, at least in part, by the Magnus or Savonius effect and/or other lifting effects. Such turbines may, for example, be relatively inexpensive, easily deployable and/or manageable, and/or may otherwise provide advantages over previous systems. According to some embodiments, small tethered water turbines are deployed in emergency, as-needed, and/or mobile applications. In some embodiments, much larger turbines (e.g., hundreds of meters in length, or more) may be deployed. Some embodiments may provide an ability to capture water flowing energy in low speed water flow yet still be capable of producing high power output—similar to propeller like bladed systems—even as much as a CoP of approximately 0.30 (or 30%) energy extraction, over 300% greater than typical Savonius type water rotors. As a tethered device, deployment may not require stanchions or other rigid holding apparatus. Further, the water rotor might be either heavier than water or lighter—which may allow a unit to operate effectively upright or inverted. Secured from above by buoys, boats or bridges, or alternatively anchored floating upward from the bottom to operate within water flow below waterways traffic, etc.

Figure 1A:
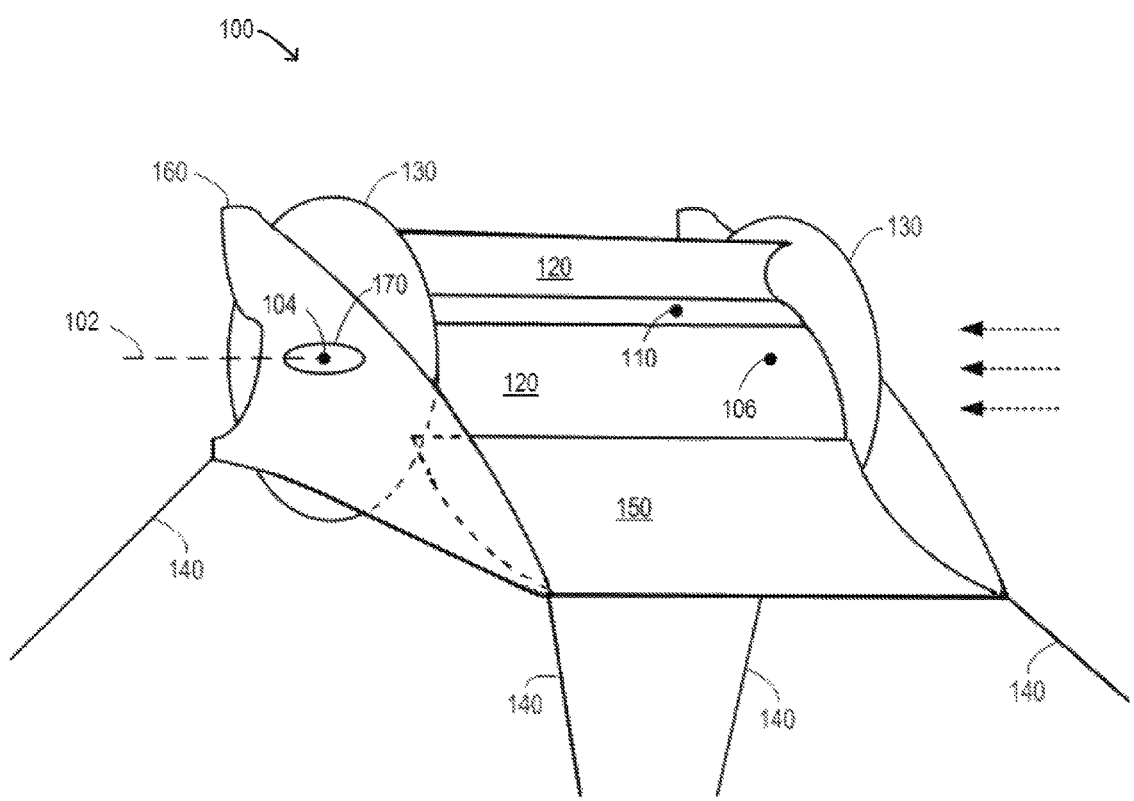
FIGS. 1A through 1C are block diagrams of systems according to some embodiments.

Referring first to FIG. 1A, a block diagram of a system 100 according to some embodiments is shown. The various systems described herein are depicted for use in explanation, but not limitation, of described embodiments. Different types, layouts, quantities, and configurations of any of the systems described herein may be used without deviating from the scope of some embodiments. Fewer or more components than are shown in relation to the systems described herein may be utilized without deviating from some embodiments.

The system 100 may comprise, for example, a substantially horizontal axis 102, a first point 104 situated on the axis 102, and/or a second point 106 situated on the axis 102 (e.g., on the other side of the system opposite the first point 104). In some embodiments, the system comprises a tethered water turbine having a drum 110 as a body. The tethered water turbine may, for example, comprise a drum 110 extending substantially between the first and second points 104, 106. The drum 110 may, for example, be partially or completely submerged. The tethered water turbine may also or alternatively comprise, in some embodiments, one or more vanes 120 coupled to the drum 110. The vanes 120 may, for example, be operable to be acted upon by a water force (e.g., as indicated by the three horizontal dotted lines in FIG. 1A) to cause the drum 110 to rotate about the axis 102.

In some embodiments, the drum 110 may extend horizontally between two side discs 130. The two discs 130 may, for example, comprise an inner surface coupled to the drum 110 and/or an outer surface comprising a projection. In some embodiments, the projections may be axles substantially aligned with the horizontal axis 102. According to some embodiments, one or more generators 170 are coupled to convert rotational energy (e.g., from the rotation of the drum 110 and/or projections 126 about the axis 102) into electrical energy. The generators 170 may, for example, be mechanically coupled to the projections and/or be suspended there from. According to some embodiments, the generators 170 are associated with a water-tight sealed gearbox.

In some embodiments, the generators 170 may also or alternatively be coupled to one or more yokes. The yokes may, for example, comprise bushings, bearings (e.g., ball bearings), and/or other devices (not shown) that are operable to facilitate and/or allow the drum 110 and/or the projections to rotate about the axis 102, while positioning the generators 170 to be operable to receive rotational energy from the rotating drum 110 and/or projections. In some embodiments, the yokes are rotationally coupled to the projections at and/or near the first and second points 104, 106 on the axis 102. According to some embodiments, the yokes may also or alternatively be parts and/or portions of the generators 170. The yokes may, for example, comprise one or more flanges, projections, couplings, and/or other objects associated with and/or attached to the generators 170.

According to some embodiments, the yokes may also or alternatively be coupled to one or more tethers 140. The tethers 140 may, in some embodiments, be coupled to the drum 110, side portions 160, projections, and/or the generators 170. The tethers 140 may, for example, couple the drum 110 to a third point (not shown in FIG. 1A) stable with respect to the rotor (e.g., at the bottom of the water flow or, if the rotor is not buoyant, above the surface of the water). In some embodiments, the tethers 140 may comprise any number of ropes, cables, wires, and/or other connective devices that are or become known or practicable. According to some embodiments, the tethers 140 are operable to couple the water turbine 110 to the third point and/or to transfer electrical energy from the generators 170 toward the third point (e.g., toward the surface of the water).

In some embodiments, the side discs 130 may act or alternatively comprise one or more stabilizers. The stabilizers may, for example, be substantially disc-shaped devices coupled to the projections. According to some embodiments, the stabilizers 150 may facilitate orientation of the water turbine (e.g., with respect to the axis 102) perpendicularly to the prevailing water flow. The stabilizers 150 may, for example, allow the water turbine to be self-positioning and/or to automatically re-position as prevailing water slow shifts direction.

This cross-flow of the water force across the water turbine (and/or the clock-wise and/or backward direction of rotation), according to some embodiments, facilitates the lifting of the water turbine 110. Even if some portion of the turbine is filled with a substance that is not lighter than water (e.g., water itself), for example, the Magnus effect associated with the rotation of the drum 110 about the axis 102 may supply a lift force to the water turbine. According to some embodiments, other lift forces (e.g., associated with the Savonius effect) may also or alternatively facilitate deployment of the water turbine.

The example of FIG. 1A illustrates a buoyant system 110, and thus the tethers 140 extend below the system 110 to prevent the system from moving up. Note however, that a heavier than water system could be provided instead, in which case tethers might extend below the system to prevent it from sinking.

Figure 1B:
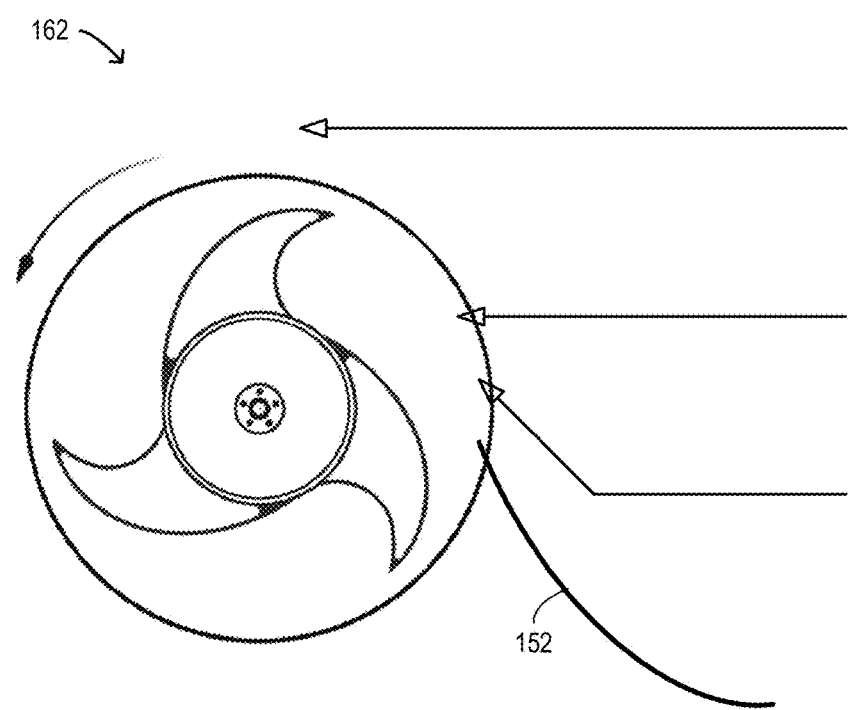

According to some embodiments a water flow deflector 150 may guide water into the vanes 120. The deflector 150 or frontal stator may have trailing edge close to the blades of the vanes 120 and above a stagnation point associated with the system 100. Note that there may be some fluctuation of the stagnation point (e.g., a level of oscillation or pulsing). Water flow volume advancing into the water rotor changes during each rotation creating a fluctuation in the 'swept area' or water and flow energy that is converted into torque as power. This fluctuation is especially evident in the water rotor without the frontal flow deflector. According to some embodiments, the deflector 150 may be allowed some freedom of movement to position the trailing edge at or above a stagnation point relative to a particular water flow speed (e.g., the trailing edge might be allowed up and down slightly). FIG. 1B illustrates a system 162 wherein a flow deflector 152 guides water to rotate a rotor. According to some embodiments, the tip of the flow deflector 152 may be placed relative to a stagnation point associated with the rotor (e.g., the tip might be located at or below the stagnation point).

Figure 1C:
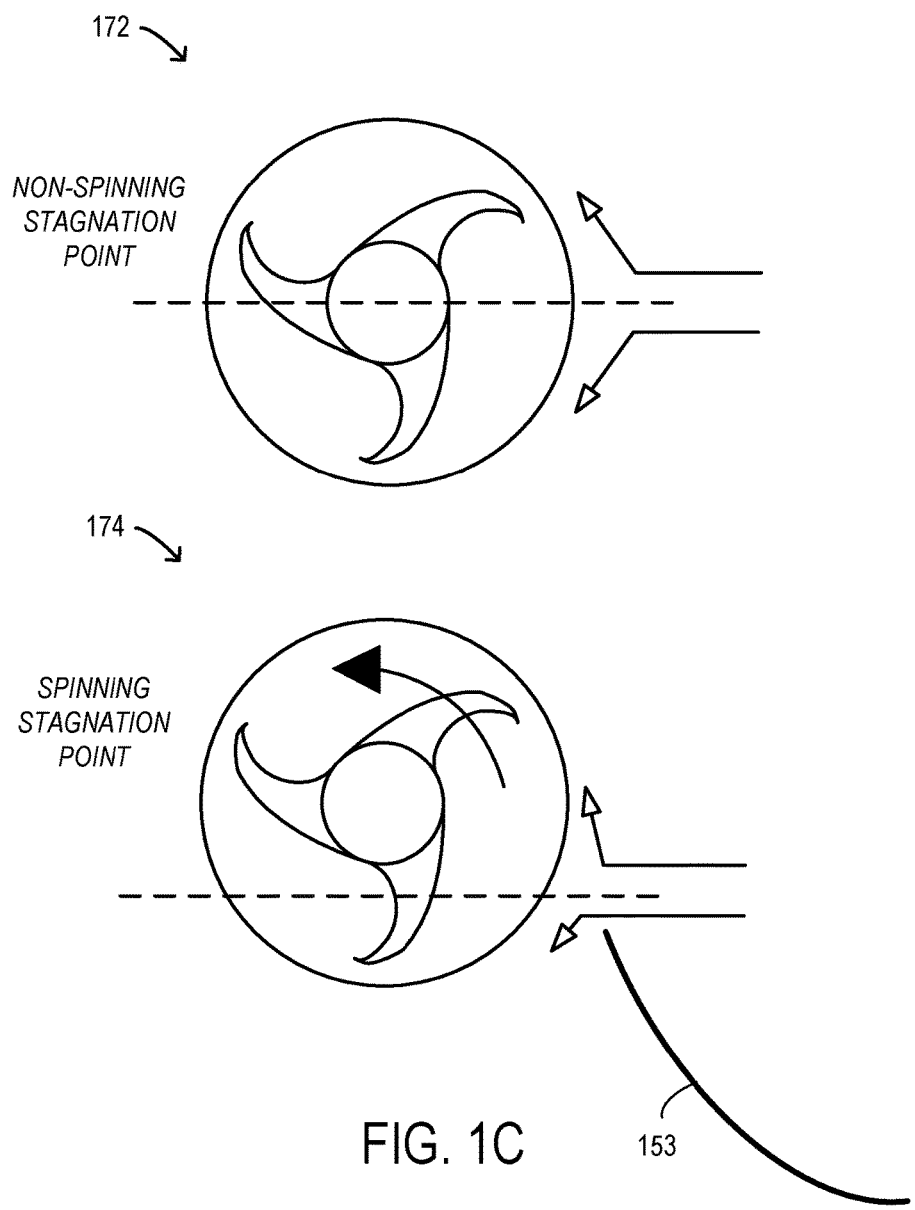

Note that the water flow speed induces the position of the stagnation point relative to the spin rate of the water rotor, and, thus, as different water speed induces power, the trailing edge of the flow deflector may be allowed freedom of movement to achieve improved power out results. That is, a rotor's stagnation point may move based on rotation of the rotor. For example, FIG. 1C illustrates a rotor's stagnation point 172 when the rotor is not spinning (the stagnation point 172 being dead center) as compared to the same rotor's stagnation point 174 when a flow deflector 153 is present and the rotor is spinning. In particular, the stagnation point illustrated in FIG. 1C moves down when the rotor rotates. According to some embodiments, the separation arrows may move down toward the edge of the stator. Note that the stagnation point typically moves down away from the direction of rotation (the stagnation point being the point where flow separation occurs). Also note that if the rotor was upside down the stagnation point (point of flow separation) would move up away for the direction of the rotation. This movement is a result of the Magnus or Savonius effect (that is, a higher pressure with flow facing the rotation and lower pressure with flow moving with rotation induces a change in the point of separation or stagnation point).

According to some embodiments, the generators 170 include a rim generator along the edge of the side discs 139 (and/or an additional center disc). For example, generators 170 may be associated with a huge magnetic stator (e.g., individual magnets) with an armature stationary within a ring housing. In such an approach, a gear box and/or center drive might not be required. Moreover, a substantial amount of electricity might be produced even at relatively slow Revolutions Per Minute ("RPM")

Figure 2A:
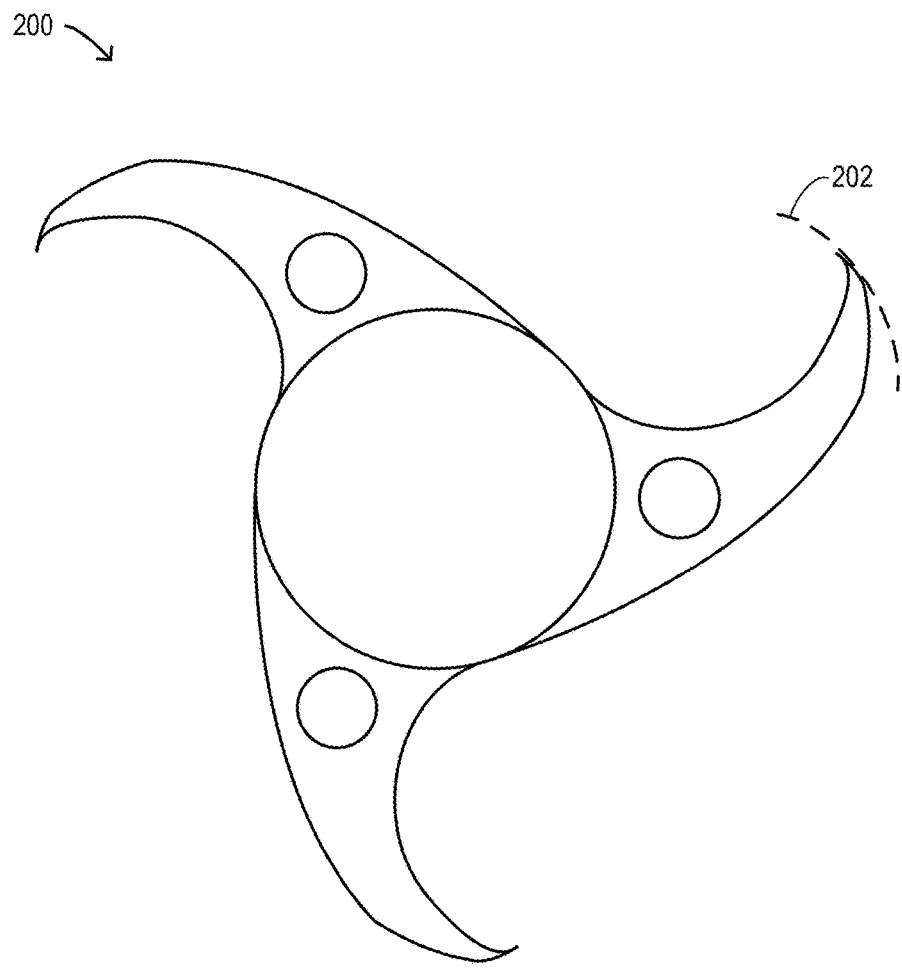
FIGS. 2A through 2C are side views of water rotors in accordance with some embodiments.
Figure 2B:
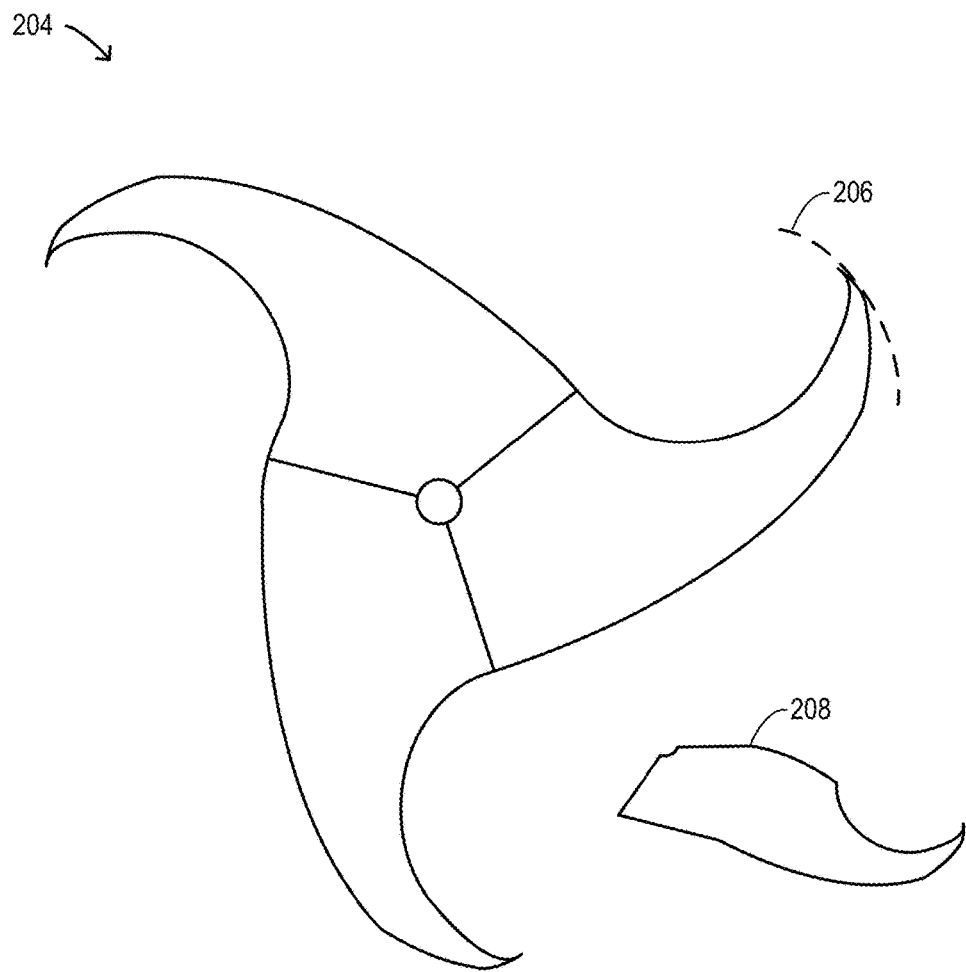

Note that a rotor drum and/or vanes may be formed in a number of different ways. For example, FIG. 2A is a side view of a drum 200 having three vanes. Note that the tip of each vane or blade may substantially mimic the surface of the drum below the vane as illustrated by the dotted line 202 in FIG. 2A. As another example, FIG. 2B illustrates a rotor 204 wherein three identical sections 208 might be bolted together or otherwise attached to create the drum and vanes. As in FIG. 2B, the tip of each vane or blade may substantially mimic the surface of the drum below the vane as illustrated by the dotted line 206 in FIG. 2B.

Figure 2C:
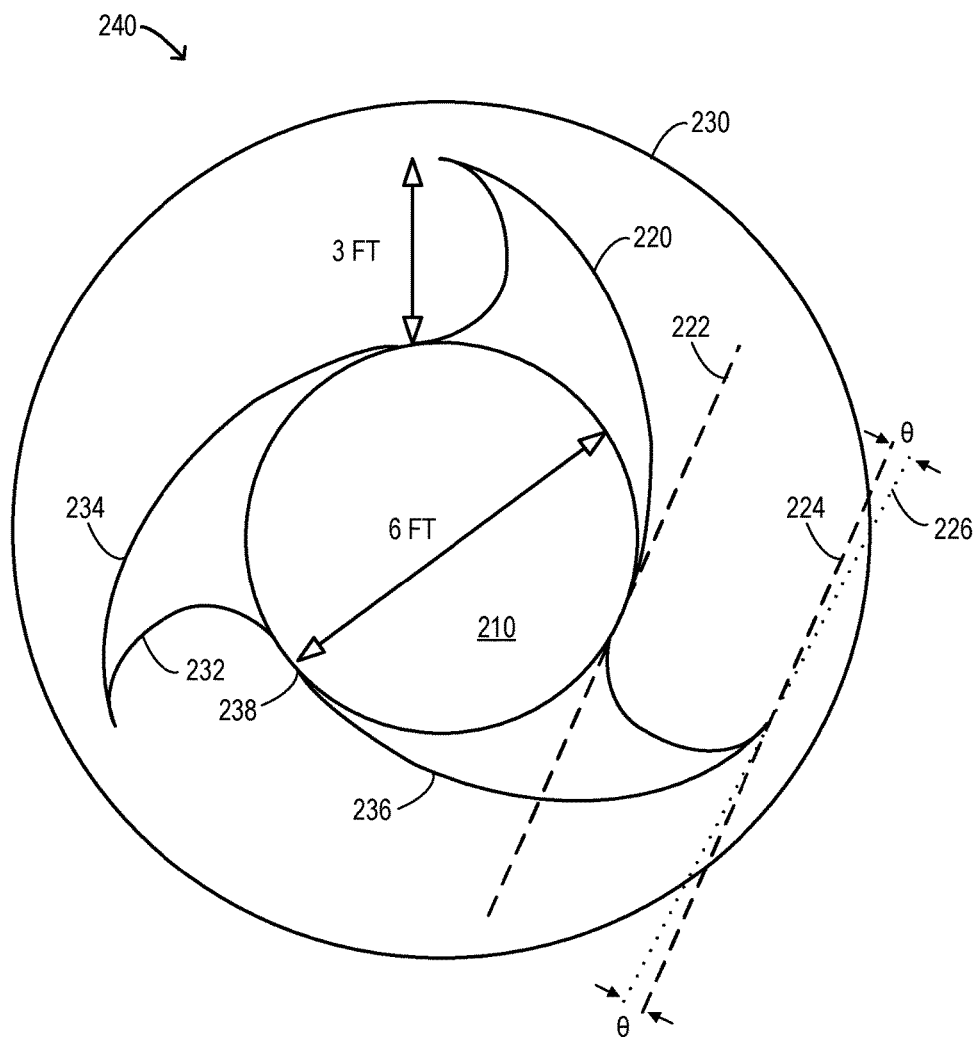

FIG. 2C is a side view of a water rotor 240 in accordance with some embodiments. The rotor 240 includes a drum 210 with three curved vanes 220. Moreover, one or more side discs 230 may be provided. By way of example only, the drum 210 might have a diameter of 6 feet while the vanes 220 extend away from the drum 310 a minimum total of 3 feet. The side discs 230 might have a diameter larger than the sum of 6 feet and 3 feet multiplied by two, accounting for both sides of the rotor 240 (e.g., greater than 12 feet). Such an approach might provide, for example, an unusually high CoP, such as a CoP in excess of 0.30 or even 0.34. Note that the vanes 220 may comprises three double sided "shark fin style" blades placed horizontally across the drum 210. Note that the cross-section of each vane 220 may include a concave side 232 and a convex side 234, curved differently than the concave side 232, and that: (1) the concave side 232 of one vane meets the convex side 236 of a neighboring vane at the rotating body (e.g., at point 238); and (2) each vane 220 is more narrow at the end opposite the rotating body as compared to the end at the rotating body. Further note that at a specific height, the side discs 230 may increase a pressure driving bubble improving efficiency. Moreover, the proportions of the device (regardless of size) including the vanes 220, drum 210, and side discs 230 may alter the CoP. According to some embodiments, an edge portion of each vane 220, located substantially opposite the drum 210, defines a plane 224 substantially parallel (e.g., parallel to within 10 degrees as illustrated by the angle θ between dashed line 224 and dotted line 226) to a plane 222 defined by a surface of the drum 210 located between the edge portion and the center of the drum 220 as illustrated by the dotted lines in FIG. 2C.

Similarly, the design of a frontal stator (both in size and curvature and dimensions) and proportions of the stators in all dimensions (front and back curved surfaces may effect the CoP along with the placement of a horizontal trailing edge of a stator and/or the trailing edge or "lip" may decrease back flow and reduce non-stator pulsing (e.g., when above a "generalized stagnation point"). Moreover, the anchor cables and anchor placement might impact the CoP. Note that in some embodiments, the drum 210 may roll around a horizontal static holding axle running through the drum 210. Moreover, the drum 210 and the axle might be sealed with water tight bearings or axle slip rings. According to some embodiments, a generator mechanism is inside the drum 210. For example, magnet may be moving attached with and in the drum 210 and an armature may be a "static" non-moving wheel or disc type device (e.g., and no gear box may be needed).

Figure 3:
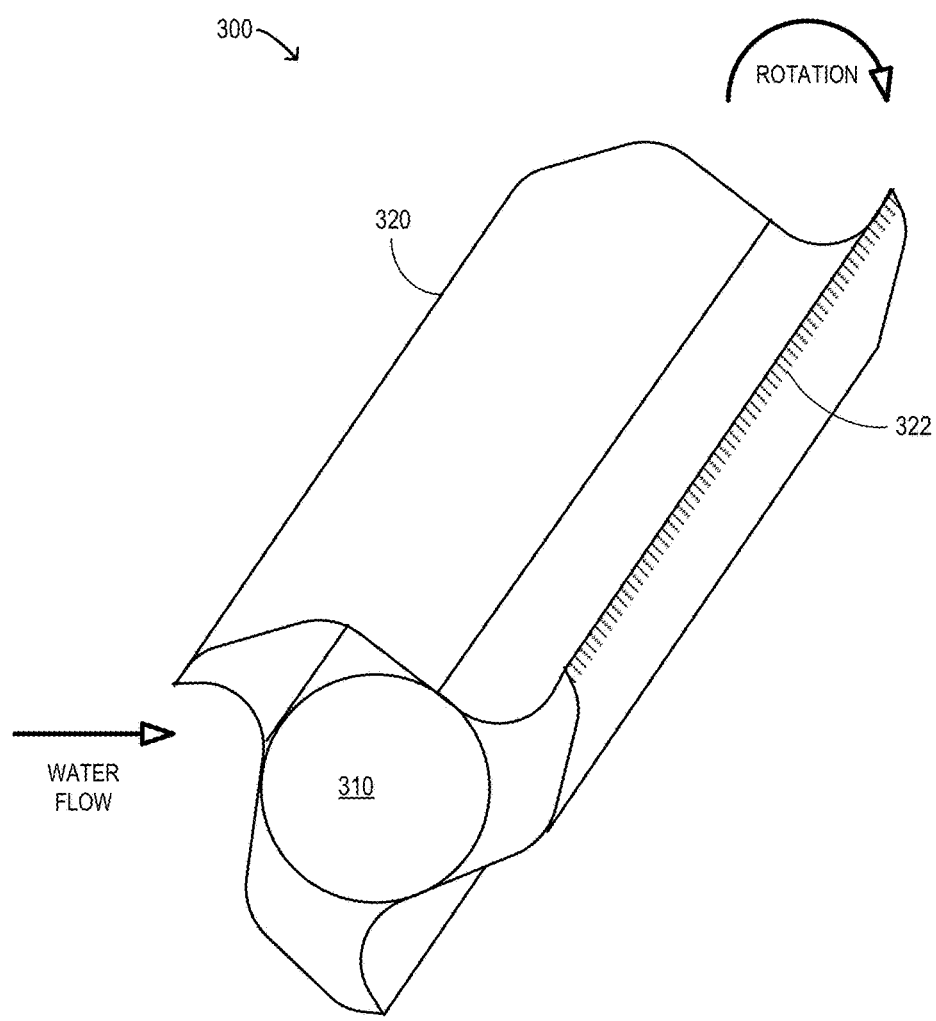
FIG. 3 illustrates a rotor according to some embodiments.

FIG. 3 illustrates a rotor 300 according to some embodiments. In particular, a drum 310 may be submerged in water and extend horizontally along a center axis between a first point on a first side of the drum 310 and a second point on a second side of the drum 310 opposite the first side. Three curved vanes 320 may be attached to the drum 310 such that the vanes 320, when acted upon by a water flow perpendicular to the axis, are operable to cause rotation about the axis, wherein an edge portion 322 of each vane, located substantially opposite the drum 310, defines a plane substantially parallel to a plane defined by a surface of the drum 310 located between the edge portion 322 and the axis. Moreover, an electrical generator coupled to the drum 310 may convert rotational energy produced by the rotation about the axis into electrical energy.

That is, the rotation caused by the water force may comprise rotation of the drum about the axis (and the rotation of the drum might generate either an upward or downward force, such as a Magnus or Savonius effect force, on the drum 310 within the water).

According to some embodiments, the maximum height of each vane 320 and the drum 310 is substantially equal to or greater than the radius of the drum 310. Moreover, a first side disc may be centered at the first point and parallel to the first side of the drum 310 and a second side disc may be centered at the second point and parallel to the second side of the drum 310, and the first and second side discs may extend past the maximum distance between the total height of each vane and the drum. Moreover, the electrical generator may comprise a first generator coupled to the first side disc and a second generator coupled to the second side disc. For example, the generators might be coupled to the side discs via at least one of: (i) chains, (ii) gears, or (iii) friction coupling. According to some embodiments, at least a portion of the generator is located within the drum 310. Moreover, the generator may include at least one magnet and at least one conductive coil that move relative to one another as a result of the rotation about the axis.

According to some embodiments, a flow deflector may be submerged with the drum 310 to direct at least some of the water flow into an area defined by a vane 320. For example, an edge portion of the flow deflector substantially proximate to the vanes 320 may be positioned substantially at or at the opposite side of a stagnation plane, wherein the water flow above the stagnation plane flows over the drum 310 and the water flow under the stagnation plane flows below the drum 310. Note that an edge portion of the flow deflector may be provided substantially proximate to the vanes 320 to define a plane substantially parallel to a plane defined by a surface of the drum 310 located between the edge portion and the axis. In addition, the flow deflector may include a first side substantially parallel to the first side of the drum 310 and a second side substantially parallel to the second side of the drum 310. According to some embodiments, the flow deflector includes an upper surface such that the water flow creates a downward force on the flow deflector and a lower surface such that the water flow creates an upward force on the flow deflector. Moreover, the flow deflector may comprise a first flow deflector located in front of the drum 310 and further comprising a second flow deflector located behind the drum 310.

According to some embodiments, the rotor 300 is buoyant and anchored via at least one flexible cable to a floor beneath the water. In this case, an active winch associated with each flexible cable might be provided (e.g., to move the rotor 300 up and down). According to other embodiments, the rotor 300 may be heavier than water and tethered via at least one flexible cable to a point above the system, such as a bridge, a boat, a damn, a buoy, or a barge. In this case, an active winch may also be associated with each flexible cable (again to move the rotor 300 in the water).

Thus, improved water rotors may be provided in accordance with some embodiments described herein. Note that globally, hydropower provides about 20% of the world's electricity and is an important renewable energy for electrical power production. However, there is a serious shortfall as demand is outpacing supply and the gap is growing. Low-head hydropower, which generates power from horizontally moving flows, can potentially increase electrical production and close this gap. However, the contribution of low-head hydropower is relatively low because traditional solutions are not economically viable, they require relatively high flow speeds, and there are ecological concerns. Thousands of rivers and streams which could provide billions of kilowatts ("kW") of electricity remain untapped.

Some embodiments described herein may provide an advanced water flow generator that is simple, efficient, and economical to manufacture. In particular, some embodiments described herein represent an advanced Savonius type rotor, which may include a stylized drum with optimally curved double-sided blades attached to a flow assisting drum and flow stators that efficiently capture water flow and extract power. The side disks may further help contain and direct or maintain the water flow pressure facilitating improved energy transfer. The rotor relies on torque rather than higher speed water velocities, allowing it to operate in nearly any flow speed. Successful testing has included water flow energy transfer at less than 2 MPH water flow. Maximum flow speeds may be unrestricted and energy transfer might only be restricted by structural limitations of a water rotor.

Moreover, various embodiments may be scalable from individual use to grid applications, include rotors that could be associated with small personal or boat sized units, commercial mid-sized units, tidal flow units, and large ocean current size units. In addition, the rotors may produce a few hundred watts or up to many megawatts.

Embodiments described herein may achieve maximum torque resulting in a high coefficient of power. This may relate directly to power vs. size vs. water flow speed. Improved energy extraction may be provided for a water flow speed ranging from 1 Mile Per Hour ("MPH") to over 20 MPH and efficiency ratings of 24% energy extraction to over 34% may be achieved.

Referring again to FIG. 1A, the frontal fixed flow deflector 150 or "stator may be positioned in a lower flow "conflict" area. the deflector 150 may provide a broad swept "power" area. Moreover, the three vanes 120 are curved such that the front of the blade is pocketed to catch and easily release captured water flow. Such a configuration provides three simultaneous phases or positions for each of the three vanes 120 as they rotate: (1) advancing "flow deflection", (2) catching "power", and (3) pulling or "retreating." As the blades advance and retreat into each phase position, several hydrodynamic effects occur. These include lift on the back of the blade, pressure into the cup of the blade, flow separation and deflection from the stagnation point into the blade cup due to the core drum acting as a flow deflection device, and assisted by the frontal flow deflector 150 (stator).

The "stagnation point" or typically the mid-point at which flow divides to go up and over or down and under the rotor is controlled by the design such that substantially all of the frontal area of water flow is directed upwards or into the moving spin of the rotor vanes 320. This may be referred to as the "swept area" and includes the total front facing area at the front of the rotor. The culmination of this design may provide an efficiency rating which is in excess of 0.30 or 30% energy capture from water flow at any speed. According to some embodiments, the system may work inverted (or at any angle) when facing the flow and may not require level positioning.

Note that the front non-moving and precisely positioned, relative to the blades and drum, flow deflector 150 or stator may mask incoming flow separation, which may reduce flow confliction with the returning vane 120, and induce additional power flow into the driving vane 120. A stator may increase efficiency and torque, from 24% without deflector to in excess of 30%. The stator may also reduce a pulse that occurs between each of the three blade phases as they spin in and out of position.

The rotor's rolling effect (roll direction) may be used to help reduce backward lean and a Magnus or Savonius effect may assist stability and/or positioning. The rotational direction of the spinning rotor may induce Magnus lift and/or a Savonius effect, generally referred to as Savonius since the roll is not faster than the flow of the medium (water flow).

Thus, depending upon whether the rotor is buoyant and anchored or heavier than water and secured from above (such as to a bridge, boat, buoy or barge). The rotor spin direction is induced to create either a downward lift force (in a hanging down configuration) or an upward lift force (in anchored versions). This effect may help the unit stay within a useable "lean" or "stand" straighter in relationship to its holding point (e.g., a less angled lean on the holding cables). Moreover, embodiments may have an ability to induce control over both lift and drag due to the direction of rotation. This effect will keep the rotor, for example, at less than a maximum lean angle of 45 degrees helpful to stay within the center of water or current flows.

The vanes 120 may have a front and back curvature, and a sharp tip edge may assist maximum flow separation and energy extraction. Also, the side discs 130 the ends of the rotor drum 110 may seal the drum 110 and blade sides to the disc. The discs 130 may extend to at least the tip height of the cross section, or higher, to assist capture of the water flow and keep the flow from spilling around the sides. The side discs are of a diameter as broad as the tip heights of the vanes 120 and may help increase a water pressure "bubble" or flow capture. Higher side discs 130 (than the blade tip heights) may thus further increase the flow capture. These features (blade curvature front and back, sharp tip, drum curvature, and the side discs) capture the water flow may result in a substantially high CoP. Note that the high level of rotational energy may be achieved by torque. Embodiments may operate in water speeds as low as 1 MPH up to high flow rates of many 10's MPH.

As described herein, rotors may be designed as either a buoyant device secured by anchors, or alternatively, a heavier than water device that can be lowered from a bridge, barge, boat, or buoy. Moreover, sizes up to 20 kilowatts may be fully transportable mobile units.

Note that smaller water rotors (e.g., up to 20 kW) may use external generators driven by large side discs. Larger water rotors might use a large disc generator integral within the central core drum. The larger generators may, for example, have one moving part (e.g., magnets may rotate within and with the central rotor drum as they surround stationary generator coils). In either case, the slow but powerful rotational energy may create electricity.

Some embodiments described herein may be classified as "low head" systems, meaning the flow is horizontal or close to horizontal through the entire system. Unlike typical low-head systems, some embodiments may be implemented in ways other than an open propeller-like bladed turbine or 'airfoil-like' turbine (which accelerate in the flow to tip speeds higher than the flow itself). Embodiments described herein may convert energy from torque moment as derived from the actual speed of the water flow itself and derives the necessary energy as pure torque, in contrast to systems with propeller-like blades that may require higher flow velocities.

Figure 4:
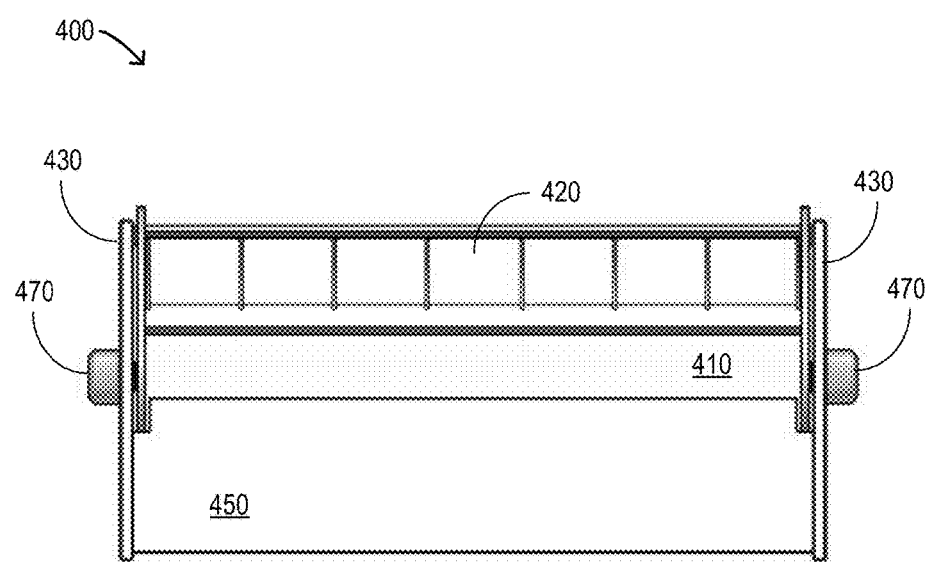
FIG. 4 is a front view of a water rotor in accordance with some embodiments.
Figure 5:
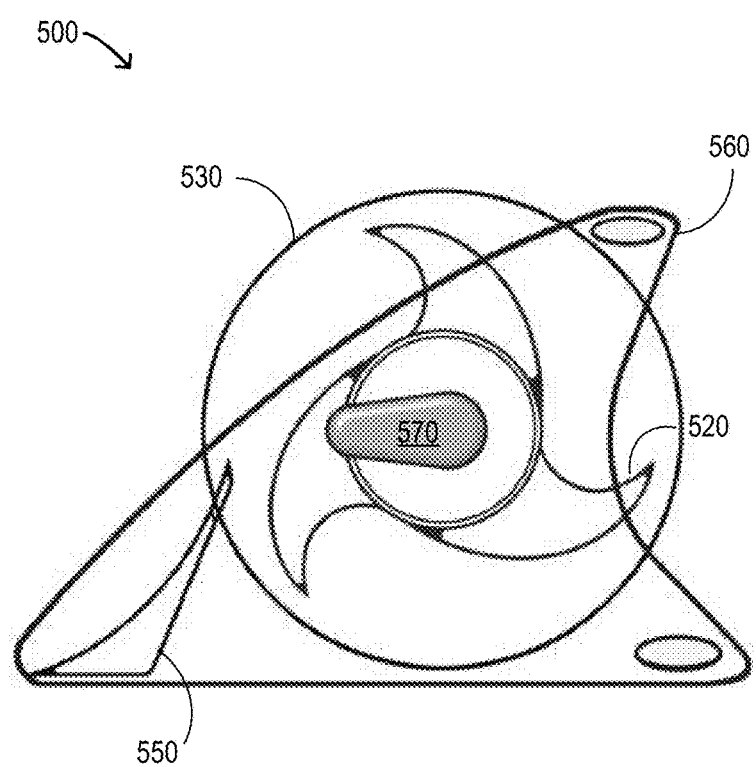
FIG. 5 is a side view of a water rotor in accordance with some embodiments.

FIG. 4 is a front view of a water 400 rotor in accordance with some embodiments. the rotor 400 includes a drum 410 with three vanes 420 and a pair of side discs 430 creating a "pocket" into which water is directed via a deflector 450. Generators 470 at each side disc 430 may convert rotational energy of the body 410 and vanes 420 into electrical energy. FIG. 5 is a side view of the water rotor of FIG. 4 in accordance with some embodiments. The rotor 500 includes a circular drum 510, vanes 520, and side discs 530. A deflector 550 guides water into the currently upper vane 520 to improve rotation. A generator 570 may, according to some embodiments, include a static axle through the drum 510 with sealed bearings at each end to allow the drum 510 and vanes 520 to roll about the axle in the water flow. For example, inside the sealed drum 510 there coupled be placed a generator 570 that includes magnets attached to the inner drum 510 facing and a nonmoving coil or armature attached to the static axle. Such a generator 570 would have only one moving component (the ring of magnets passing the static coils) creating electricity. According to other embodiments, side gearbox's associated with external side generators 570 may be provided on the outside of the side drum discs 530.

Each of the three sharp tipped "shark fin" like vanes 520 attached to the core drum 510 may include an edge that leads from a position parallel to the surface of the drum 510. Each blade may have frontal curvature and back side composite curvature that assists in inducing a high CoP for this style of rotor 500. Further, the side discs 530 may exceed the vertical height or maximum width of the tips of the vanes 520 (circumference) developing a water flow pressure bubble that is consistent during 360° rotation of the rotor 500. Still further, the frontal deflector 550 scoop or stator may be positioned with respect to the stagnation point of the incoming flow (stagnation point assumed without the stator). The stagnation point (without a stator) may move from a midpoint to a lower position due to the Magnus effect. Adding the stator with the trailing edge, or back edge, of the stator at or above the induced stagnation point may further assist in inducing a higher CoP output. According to some embodiments, dual stator configuration may be provided, such as for tidal flow (two-way flow) applications. A dual stator configuration may include a stator similar to the front but located on the opposite side and offset at the opposite site. In this case, the back stator may continue to induce continual rotation in the same direction regardless of whether the flow is coming form the front or the back, as in a tidal situation.

Note that the device illustrated in connection with FIGS. 4 and 5 may have various dimensions. For example, the device might be 20 to 30 feet wide with side discs having a 10 foot diameter. As another example, the device might be 240 feet wide with side discs having a 100 foot diameter.

Figure 6:
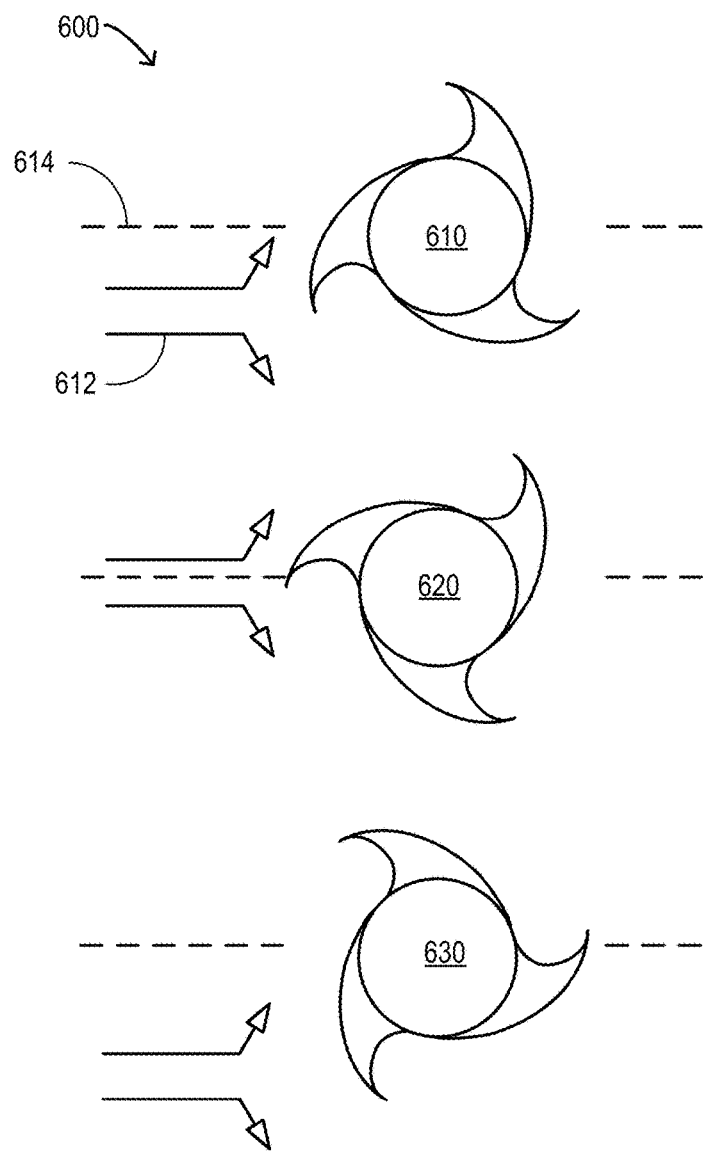
FIGS. 6 and 7 illustrate water flow patterns in accordance with some embodiments.
Figure 7:
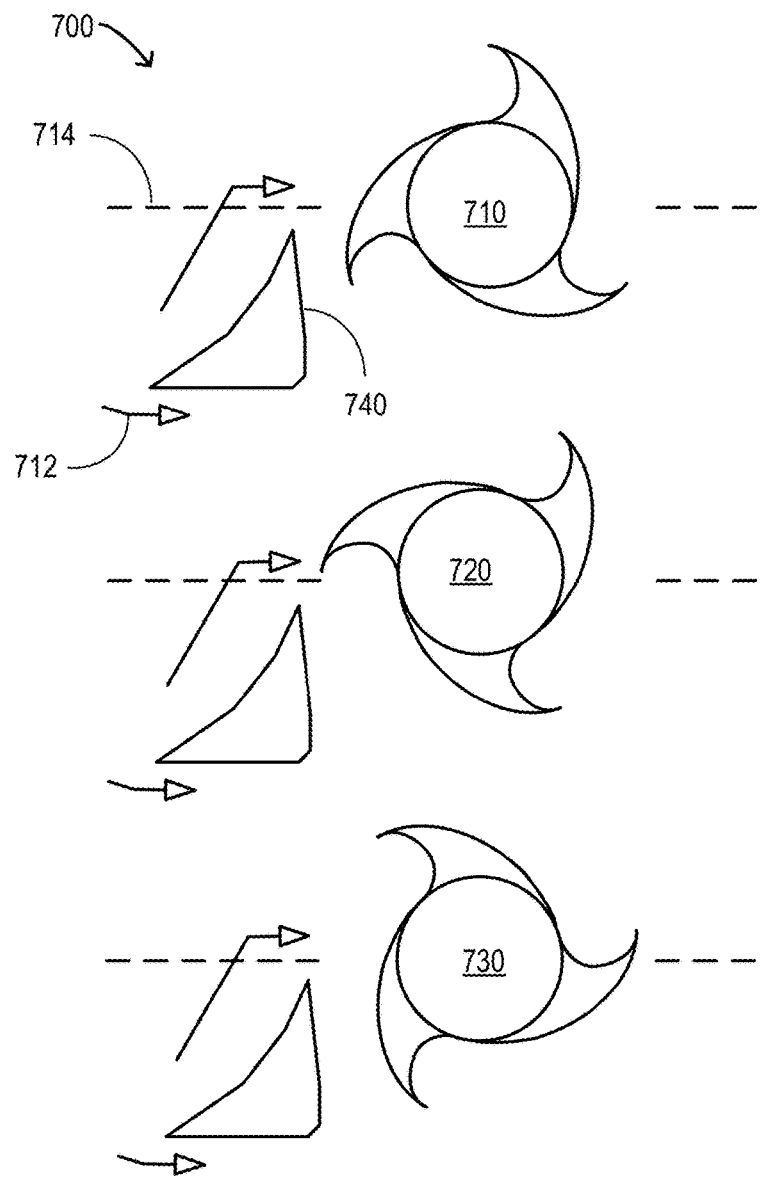

FIGS. 6 and 7 illustrate water flow patterns 600/700 in accordance with some embodiments. In particular, FIG. 6 illustrates three rotor phases 610, 620, 630. With every revolution of the three bladed rotor, each blade moves into one of the "peak" positions as shown in the three rotational positions. Note that the cup of the blade, the curvature of the central core-drum face, and the back of each blade simultaneously play a role in each of the three phase 610, 620, 630 positions. As the rotor turns each blade moves from one position to the other in sequence, leading into position and retreating as each blade leads into the next position. In simple terms, water flowing 612 past the rotor does three things simultaneously: (1) pushes into the upper cup face, (2) flows up the drum face into the cup face, and (3) the back of the blade creates a lower pressure surface in certain positions that may also help pull the blade in its rotation.

The stagnation point 614 may represent where flow separates to go either "up" or "down" is shown by a dotted line in FIG. 6. Due to the rotation of the rotor, and the phases 610, 620, 630 as mentioned above, the stagnation point 614 may fluctuate up and down depending upon the position of the rotating blades. Above the stagnation point is positive assisting flow energy, and below the stagnation point is detrimental drag flow. The power of the rotor comes from the upper flow above the stagnation point, referenced as the "swept area." The swept area may be difficult to calculate since it is changing in flow area three times for every revolution of the rotor. That is, each phase 610, 620, 630 may be associated with different capture dimensions. This changing swept area flow may create a pulsing effect where a pulse of increased and then decreased energy is transferred through the rotation of the rotor as it turns in a flow 612.

To help reduce this effect, FIG. 7 illustrates three phases 710, 720, 730 of rotor rotation when a deflector or stator 740 is added to direct water flow 712. The fixed stator 740, or curved deflector, in front of the rotor shields the flow area positioned at the top from the highest stagnation point position 714 to slightly below the total diameter of the turning rotor blades. The stator 714 may be placed at or above the highest stagnation point position and as close to the diameter of the rotor blades as possible to minimize trip the flow negatively in certain positions. The back of the stator 740 may be more vertical as shown since the lower sheltered blade coming up from under at the front pushes water ahead of it while the blade is in the lower frontal quadrant (which may help block back flow). According to some embodiments, the stator 740 is as wide as the rotor is wide across the water flow. Certain versions of stator could be longer at the bottom (scoop length) and could flair or become wider at the lower front "mouth" to assist flow up into the blade face during all three phases of blade rotation. Note that the positive swept area may remain relatively constant due to the stator 740, thus improved flow energy may be achieved without the pulsing effect (e.g., a CoP may be achieved as high as or higher than 0.30). Note that the rotor may works just as efficiently placed "upside down" in an opposite water flow.

According to some embodiments, the back of the stator 740 may be reduced into a similar curvature as the front, utilizing a crescent type shape. This might have two advantages over the "thicker" stator design illustrated in FIG. 7: (i) it may induce the Bernoulli effect on the back side of the stator, and (ii) causes flow attachment to occur, directing the passing lower flow turbulence upwards along the back curve of the stator, achieving higher efficiency for the rotor blades. Such a thin stator 740 design may also reduce back flow pressure and assist overall upward flow characteristics to increase rotational power (e.g., a torque increase).

Figure 8:
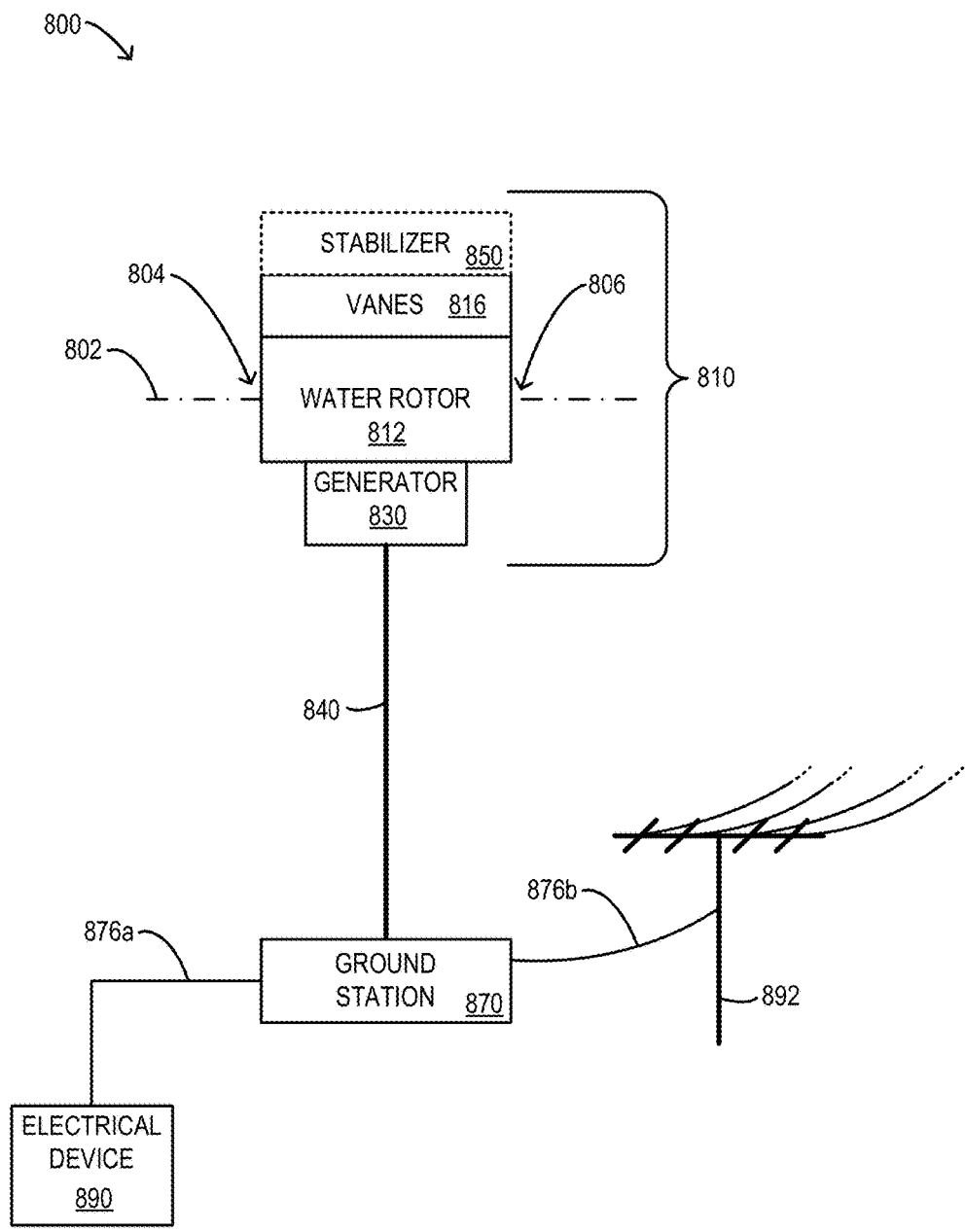
FIG. 8 is a block diagram of a system according to some embodiments.

Turning to FIG. 8, a block diagram of a system 800 that may operate in accordance with any of the embodiments described herein. The system 800 may, for example, comprise a substantially horizontal axis 802, a first point 804 along the axis 802, a second point 806 along the axis 802, and/or a water turbine 810 that rotates about the axis 802 to produce electrical energy. The water turbine 810 may, for example, comprise a submerged water rotor 812 having one or more vanes 816 and/or one or more generators 830. In some embodiments, the water turbine 810 is coupled to a tether 840 and/or may comprise one or more stabilizers 850. The tether 840 may, for example, couple the water turbine 810 to an above-water ground station 870. The ground station 870 may, for example, supply electrical energy (e.g., via electrical feeds 876*a-b*) generated by the water turbine 810 to one or more electrical devices 890 and/or to an electrical grid 892.

According to some embodiments, the components of the system 800 may be similar in configuration and/or functionality to components associated with any of embodiments described herein. In some embodiments, fewer or more components than are shown in FIG. 8 may be included in the system 800.

According to some embodiments, the electrical energy generated by the water turbine 810 is provided, via the tether 840, to the ground station 870. The tether 840 may, for example, comprise any number, type, and/or configuration of structural and/or electrical cables, ties, wires, and/or other devices. In some embodiments, the tether 840 may comprise a structural cable to maintain a physical connection between the water turbine 810 and the ground station 870, an electrical cable to transfer the electrical energy from the water turbine 810 to the ground station 870, and/or a grounding cable to provide electrical grounding to the water turbine 810.

According to some embodiments, the ground station 870 may provide the electrical energy via a first electrical feed 876a to an electrical device 890. In the case that the water turbine 810 comprises a small (e.g., about ten to thirty feet in diameter and/or length) backpack and/or emergency power version, for example, the water turbine 810 is utilized to directly power one or more electrical devices 890. The electrical devices 890 may include, for example, a camp lantern, a television, radio, and/or other appliance or device. In some embodiments, the electrical device 890 may comprise a DC device powered directly from the water turbine 810 (e.g., via the ground station 870 and the first electrical feed 876a) and/or from battery power from batteries (not shown) of the ground station 870 associated with and/or charged by the water turbine 810.

According to some embodiments, the ground station 870 may invert DC power received from the water turbine 810 into AC power. The AC power is utilized, for example, to power one or more AC electrical devices 890 via the first electrical feed 876a. In some embodiments, the AC power may also or alternatively be supplied via the second electrical feed 876b to an electrical grid 892. The electrical grid 892 may, for example, comprise an interconnection to a public utility, municipal, and/or private electrical grid. In some embodiments, the electrical grid 892 may comprise any electrical distribution system and/or device. The electrical grid 892 may, for example, comprise and electrical sub-station, an electrical pole, a transformer, underground electrical wires, and/or a fuse box and/or electrical wiring system of a vehicle and/or building (such as a residence and/or business). In some embodiments, a plurality of tethers 840 and/or water turbines 810 are coupled to and/or associated with the ground station 870. According to some embodiments, a plurality of ground stations 870 may also or alternatively supply electrical energy generated by one or more water turbines 810 to one or more electrical grids 892 and/or electrical devices 890. "Farms" and/or "clusters" of tethered water turbines 810 may, for example, be utilized to provide environmentally friendly electrical energy to meet electrical consumption needs.

Figure 9:
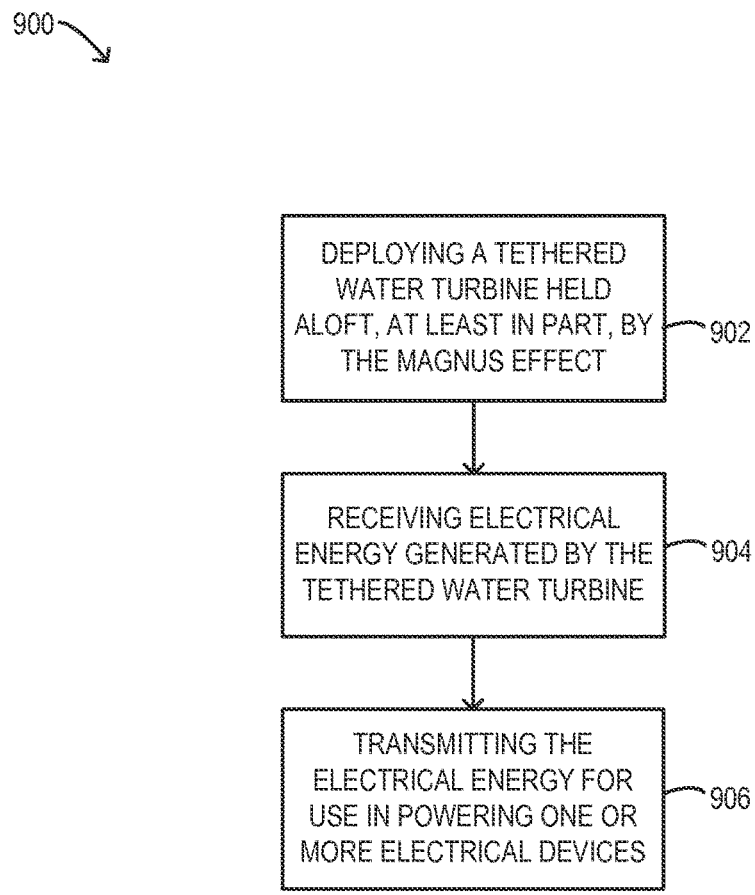
FIG. 9 is a flowchart of a method according to some embodiments.

Referring now to FIG. 9, a method 900 according to some embodiments is shown. In some embodiments, the method 900 may be conducted by and/or by utilizing any of the systems and/or any of the system components described herein. The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 900 may begin by deploying a water turbine in accordance with any of the embodiments described herein, at 902. According to some embodiments, the water turbine is deployed by at least partially filling a drum of the water turbine with water. In some embodiments, both a natural buoyancy and the Magnus/Savonius effect may cause the water turbine to remain at a deployed depth.

The method 900 may continue, according to some embodiments, by receiving electrical energy generated by the tethered water turbine, at 904. The water turbine may, for example, rotate and/or spin about a horizontal axis to drive one or more generators to generate electrical energy. In some embodiments, the electrical energy is received by a device, entity, and/or other object such as a ground station, building, structure (e.g., a bridge, tower, and/or other structure), and/or vehicle (e.g., a ship, aircraft, train, and/or other vehicle). In some embodiments, the same entity and/or device that facilitated, conducted, and/or was otherwise associated with the deployment of the water turbine (e.g., at 902) may receive the electrical energy. According to some embodiments, the electrical energy may be utilized, inverted, converted, stored, and/or otherwise managed. Electrical DC energy received from the water turbine may, for example, be converted or inverted to AC electrical energy, and/or is stored in one or more batteries or battery banks.

According to some embodiments, the method 900 may continue by transmitting the electrical energy for use in powering one or more electrical devices, at 906. The electrical energy may, for example, be transmitted to one or more electrical devices local to the device, object, and/or entity associated with deploying the water turbine (e.g., at 902) and/or associated with receiving the energy from the water turbine (e.g., at 904).

Figure 10:
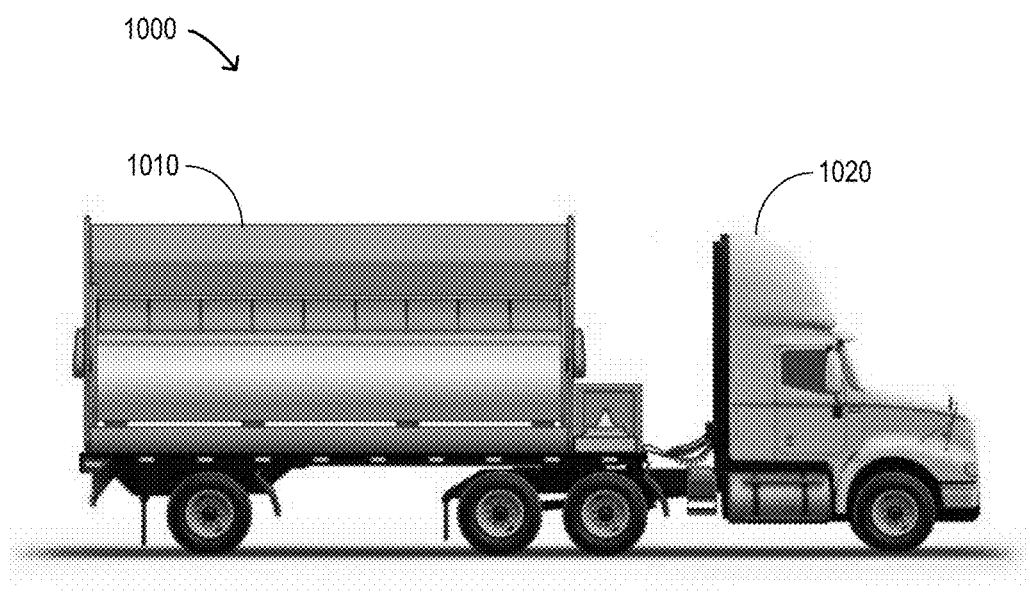
FIG. 10 illustrates a transportable water rotor according to some embodiments.

In some embodiments, the electrical energy may also or alternatively be transmitted for powering other electrical devices and/or for facilitating the powering of other electrical devices. In the case that the electrical energy is transmitted to a power grid (e.g., by a larger water turbine and/or by a cluster of water turbines), for example, the electrical energy may simply be added to the pool of electrical energy utilized by the grid to power various electrical devices (e.g., various homes and/or businesses). For example, FIG. 10 illustrates 1000 a commercial sized water rotor 1010 that might transported via a flat-bed truck 1020 according to some embodiments. By way of example only, the rotor might be 17 feet wide and have side discs with a diameter of 5 or 6 feet.

Figure 11:
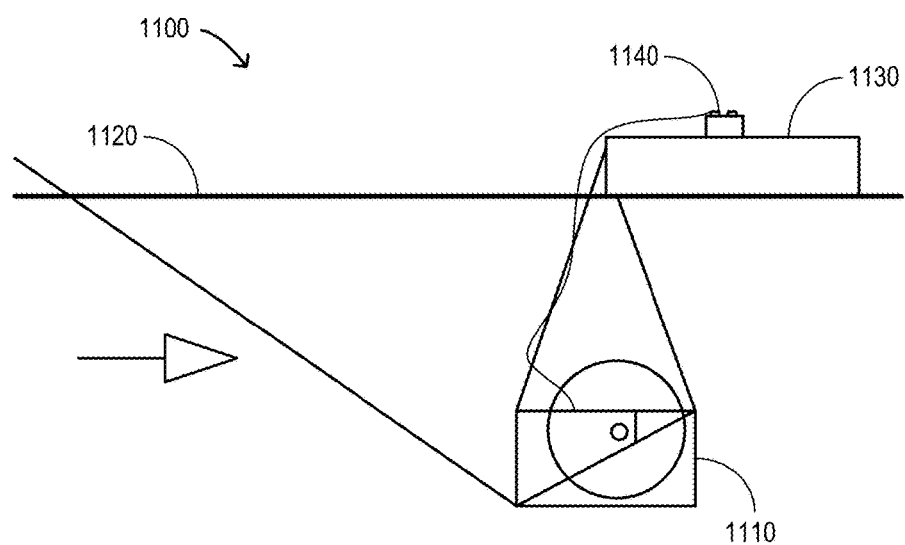
FIG. 11 illustrates a deployed water rotor in accordance with some embodiments.

According to other embodiments, a hiker, boater, home owner, and/or other entity or individual may utilize a small version of a water turbine, for example, to power one or more camping, boating, and/or residential electrical devices. For example, FIG. 11 illustrates 1100 a water rotor 1110 submerged beneath a surface 1120 of a body of water in accordance with some embodiments. In particular, the water rotor 1110 is attached to an above-water platform 1130 to power a battery 1140.

According to some embodiments, the electrical energy produced by the water turbine may be sold, traded, and/or otherwise provided to a plurality of consumers. In some embodiments, the consumers of the electrical energy may, for example, power various electrical devices utilizing the electrical energy. In some embodiments, the electrical energy is associated with incentives and/or other benefits associated with the renewable and/or environmentally friendly nature of the water turbine and/or the method with which the electrical energy is produced. Consumers may pay a premium and/or otherwise specifically choose, for example, to utilize some or all of the energy produced by the water turbine (and/or energy representing the electrical energy produced by the water turbine). According to some embodiments, other intrinsic benefits and or externalities may be associated with utilizing the water turbine and/or the "green" electrical energy produced there from.

Figure 12:
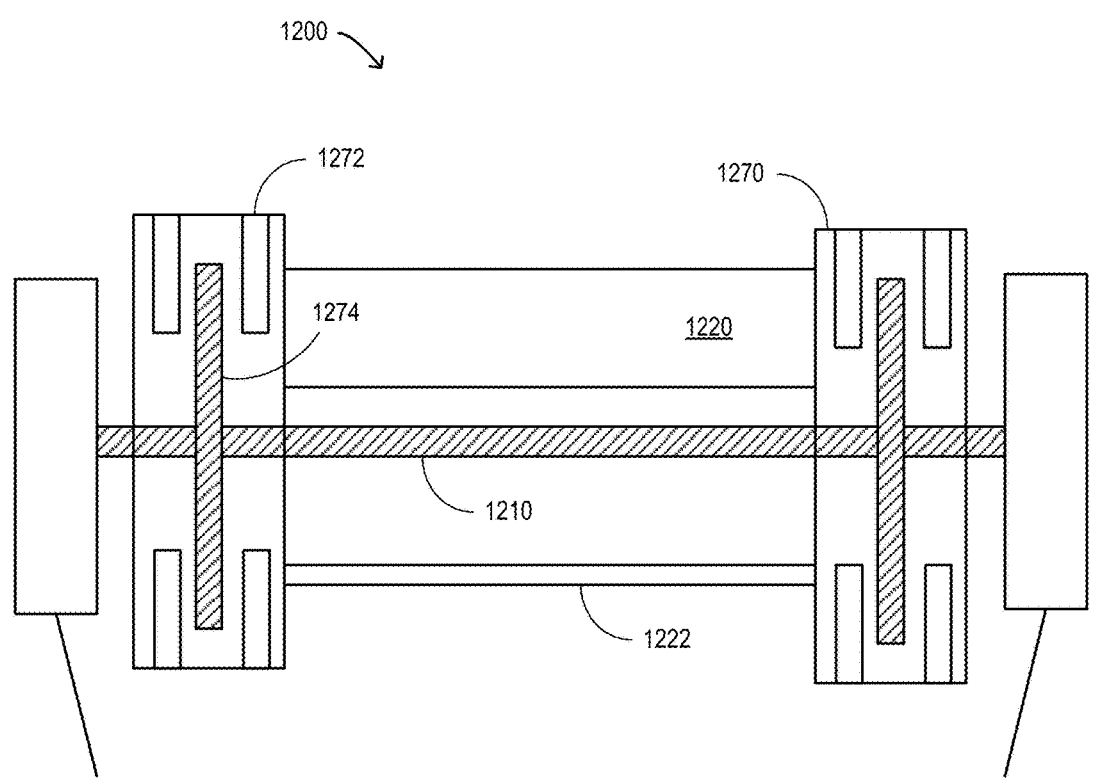
FIG. 12 is a frontal view of a water turbine having side generators according to some embodiments.

FIG. 12 is a frontal view 1200 of a water turbine having side generators according to some embodiments. An axle 1210 may be moved as vanes 1220, 1222 are pushed by a flow of water. A pair of generators 1270 located at each side of the axle 1210 include magnets 1272 and non-moving stationary coils 1274. As the magnets 1272 move past the coils 1274, a current will be produced. Note that many variations and/or implementations may be provided for the embodiments described herein. For example, according to some embodiments, vanes may be attached to a submerged drum (and thus cause the submerged drum to rotate). In other embodiments, the vanes may rotate while the submerged drum does not. According to some embodiments, the generator 1270 does not use a rim of moving magnets but in fact uses two discs of magnets 1272 attached to the rim, on each side of the nonmoving coil 1274. Such an approach may provide an increased diameter generator and act to contain the water pressure load against the driven blades 1220, 1222. The generator 1270 may be housed in a metal or fiberglass case.

Figure 13:
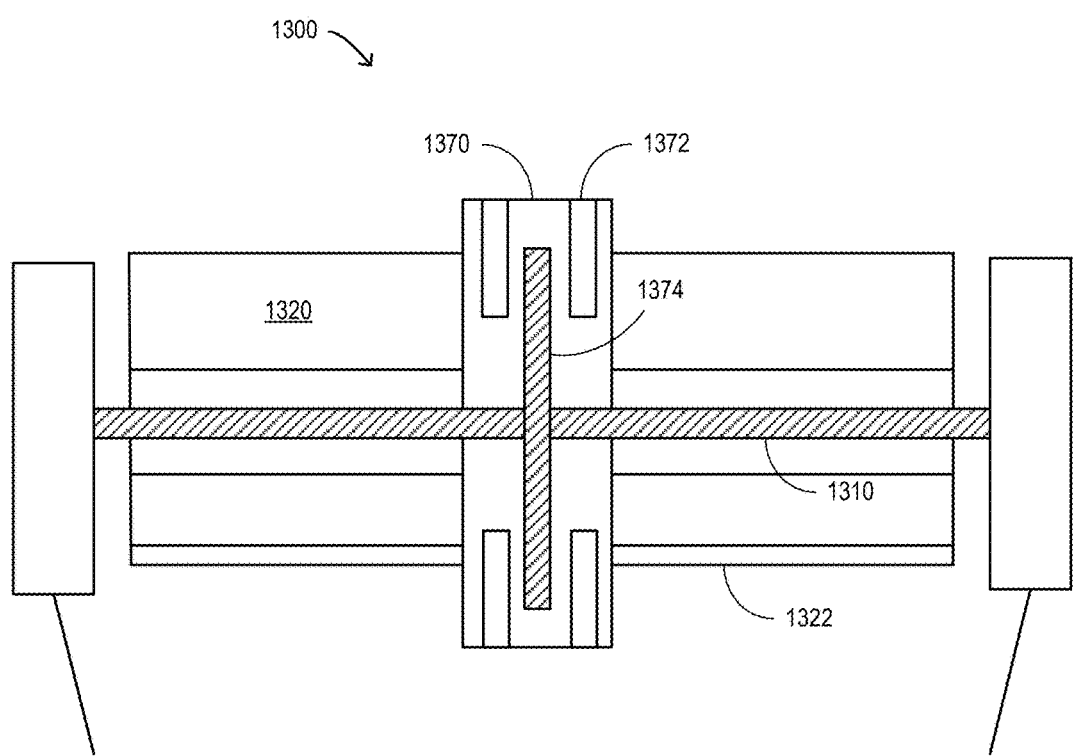
FIG. 13 is a frontal view of a water turbine having a center generator according to some embodiments.

According to other embodiments, a single generator may be placed in the center of the water rotor. For example, FIG. 13 is a frontal view 1300 of a water turbine having a center generator 1370 according to some embodiments. As before, an axle 1310 may be moved as vanes 1320, 1322 are pushed by a flow of water. The generator 1370 located at the center of the axle 1310 include magnets 1372 and non-moving stationary coils 1374. As the magnets 1372 move past the coils 1374, a current will be produced. In this embodiment, the two outside discs may include stylized buoyancy appendages, and the center core "static" axle may be a large tube (not solid) attached to the nonmoving armature or "coil" holding spokes around which the magnets rotate. The center axle 1310 may be centered within the drum in a tube that is part of the center of the inner drum, a core tube running laterally from side to side as part of the insides of the drum. The drum tube may be, for example, larger than the static axle so as not to create an interface or friction. Bearings may be provided that seal the generator pod or disc from the external elements (i.e., water).

Such a rotor may provide a 20 kW generator system with the central large disc generator 1370 being capable of producing electrical efficiency at very low RPM. This type of generator 1370 has only one moving part (which is the outer drum and magnets as they roll past the fixed center-spoke armature with the static coils). The system may be, for example, firmly anchored to a river bed with the rotor suspended below the surface at a depth of maximum flow speed. Power may then be conducted to the user community via an underwater cable. Such a system may, according to some embodiments be fully mobile and designed to fit in or on a standard truck trailer.

Figure 14:
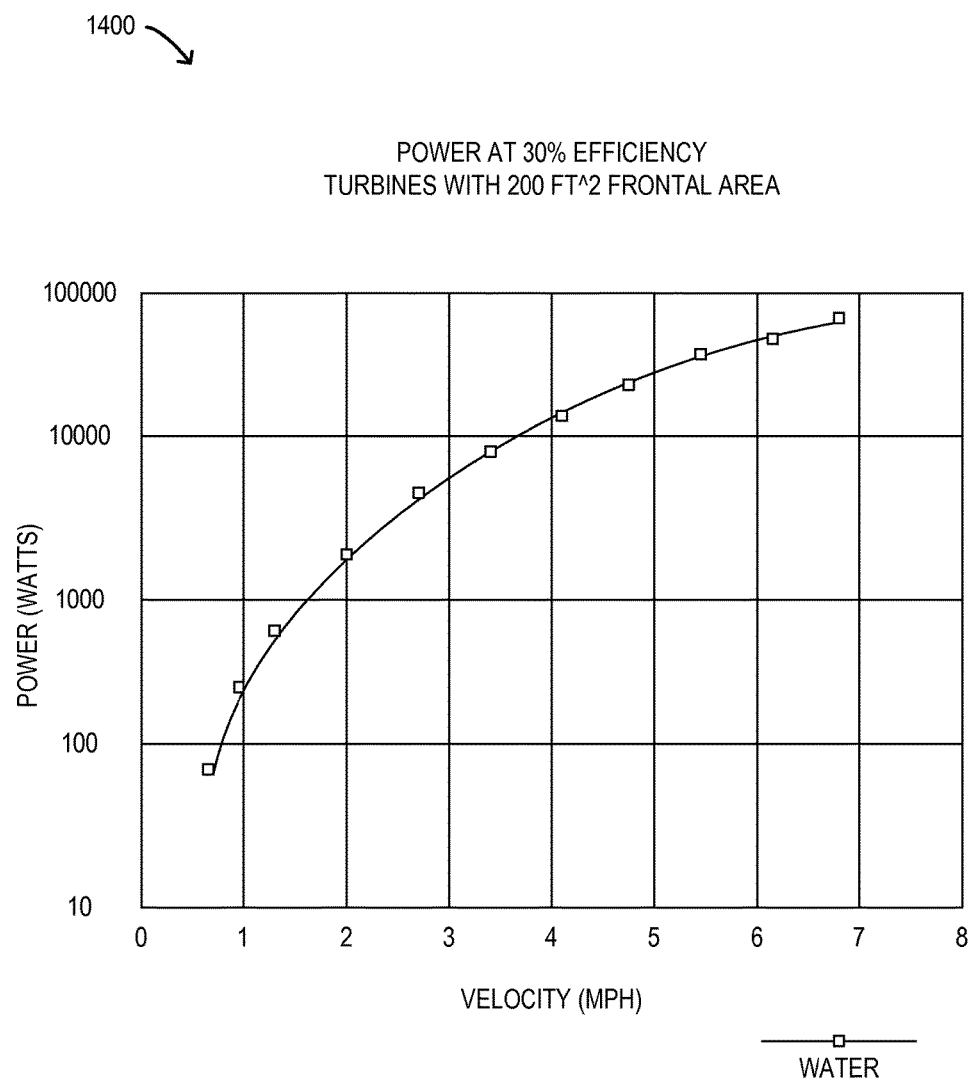
FIG. 14 illustrates potential power generation at various water velocities according to some embodiments.

FIG. 14 illustrates potential power generation 1400 at various water velocities according to some embodiments. Note that at 4 mph flow speed, some embodiments described herein may generate about 20 kW, in this case referencing a swept area, or frontal area of 200 square feet (e.g., 10 feet be 20 feet). As flow speed increases, power output may increase as indicated in the graph. Note that some embodiments may provide relatively small consumer use units, including a "boater's rolling fender" water rotor which might provide power to boats at anchor while in slowly moving currents. The collapsible device might be dropped into the current, automatically fill with water, and begin spinning in the current. Note that power output per "Swept Area" increases proportionately with increasing or decreasing output linear to the size of the device reflecting the high CoP.

The several embodiments described herein are solely for the purpose of illustration. Those skilled in the art will note that various substitutions may be made to those embodiments described herein without departing from the spirit and scope of the present invention. For example, although examples deploying a single water rotor have been described herein, note that embodiments could be deployed as groups of water rotors, include horizontal or vertical lines of rotors, parallel or sequential sets of rotors, and/or a 2D or 3D matrix of rotors. Further note that some embodiments may provide for a water rotor that is oriented substantially vertically underwater (e.g., instead of substantially horizontal as primarily described herein). That is, embodiments might be used be used horizontally or vertically, or anything in-between as long as it is orientated facing the water flow. For example, a water rotor may work when standing on its side (e.g., as long as the face angle and frontal swept area is consistent with the descriptions herein) in rotor "stacks," such as in relatively shallow water. Those skilled in the art will also recognize from this description that other embodiments may be practiced with modifications and alterations limited only by the claims.

What is claimed is:

1. A system including a rotating body to be submerged in water and extending horizontally along a center axis between a first point on a first side of the rotating body and a second point on a second side of the rotating body opposite the first side, the system comprising:

exactly three curved vanes circumscribing the rotating body wherein the exactly three curved vanes, when acted upon by a water flow perpendicular to the center axis, are operable to cause rotation of the rotating body about the center axis, and wherein a cross-section of each vane includes a concave side and a convex side, the convex side curved differently than the concave side, such that:

(1) the concave side of one vane meets the convex side of a neighboring vane at the rotating body in a smooth, substantially linear transition from the concave side of the one vane to the convex side of the neighboring vane, (2) each vane is more narrow at a tip end opposite the rotating body as compared to a root end at the rotating body, and (3) an edge portion of each vane, located at the tip end, defines a plane substantially parallel to a plane defined by a tangential surface of the rotating body, the tangential surface being located between the edge portion and the center axis;

a flow deflector comprising an edge proximate to the rotating body, the flow deflector guiding the water flow into the curved vanes for allowing operation in various water flow speeds ranging from 1 mile per hour ("MPH") to over 20 MPH;

a first side disc centered at the first side of the rotating body;

a second side disc oriented parallel to the first side disc and centered at the second side of the rotating body; wherein the first and second side discs each comprise a radius that is greater than a height of each of the three vanes;

a first electrical generator coupled to the first side disc; and a second electrical generator coupled to the second side disc, wherein the first and second electrical generators convert rotational energy produced by the rotation of the rotating body about the center axis into electrical energy.

2. The system of claim 1, wherein the rotation of the rotating body generates either an upward or downward lifting force on the rotating body within the water.

3. The system of claim 1, wherein at least a portion of at least one of the first generator or the second generator is located within the rotating body.

4. The system of claim 3, wherein at least one of the first generator or the second generator includes at least one magnet and at least one conductive coil that move relative to one another as a result of the rotation of the rotating body about the center axis.

5. The system of claim 1, wherein the flow deflector includes a first side substantially parallel to the first side of the rotating body and a second side substantially parallel to the second side of the rotating body.

6. The system of claim 1, wherein the flow deflector includes an upper surface such that the water flow creates a downward force on the flow deflector and a lower surface such that the water flow creates an upward force on the flow deflector.

7. The system of claim 1, wherein the system is buoyant and anchored via at least one flexible cable to a floor beneath the water.

8. The system of claim 1, wherein the system is heavier than water and tethered via at least one flexible cable to a point above the system.

9. The system of claim 8, wherein the point is associated with at least one of: (i) a bridge, (ii) a boat, (iii) a dam, (iv) a buoy, or (v) a barge.

10. A method associated with generation of electrical energy by a water turbine, the water turbine including a rotating body to be submerged in water and extending horizontally along a center axis between a first point on a first side of the rotating body and a second point on a second side of the rotating body opposite the first side, the method comprising:
    deploying the water turbine, wherein the water turbine comprises:
        exactly three curved vanes circumscribing the rotating body wherein the exactly three curved vanes, when acted upon by a water flow perpendicular to the center axis, are operable to cause rotation of the rotating body about the center axis, and wherein a cross-section of each vane includes a concave side and a convex side, the convex side curved differently than the concave side, such that:
        (1) the concave side of one vane meets the convex side of a neighboring vane at the rotating body in a smooth, substantially linear transition from the concave side of the one vane to the convex side of the neighboring vane;
        (2) each vane is more narrow at a tip end opposite the rotating body as compared to a root end at the rotating body; and
        (3) an edge portion of each vane, located at the tip end, defines a plane substantially parallel to a plane defined by a tangential surface of the rotating body, the tangential surface being located between the edge portion and the center axis;
    a flow deflector comprising an edge proximate to the rotating body, the flow deflector guiding the water flow into the curved vanes for allowing operation in various water flow speeds ranging from 1 mile per hour ("MPH") to over 20 MPH;
    a first side disc centered at the first side of the rotating body,
    a second side disc oriented parallel to the first side disc and centered at the second side of the rotating body, wherein the first and second side discs each comprise a radius that is greater than a height of each of the three vanes;
    a first electrical generator coupled to the first side disc; and
    a second electrical generator coupled to the second side disc, wherein the first and second electrical generators convert rotational energy produced by the rotation of the rotating body about the center axis into electrical energy;
    operating the water turbine to generate the electrical energy; and
    transmitting the electrical energy to power an electrical device.

11. The method of claim 10, further comprising:
    converting the electrical energy into a different form prior to transmitting the electrical energy for use.

12. A method associated with generation of electrical energy by a submerged water turbine, the water turbine including a rotating body to be submerged in water and extending horizontally along a center axis between a first point on a first side of the rotating body and a second point on a second side of the rotating body opposite the first side, the method comprising:
    generating electrical energy by the submerged water turbine, the water turbine comprising:
        exactly three curved vanes circumscribing the rotating body wherein the exactly three curved vanes, when acted upon by a water flow perpendicular to the center axis, are operable to cause rotation of the rotating body about the center axis, and wherein a cross-section of each vane includes a concave side and a convex side, the convex side curved differently than the concave side, such that:
        (1) the concave side of one vane meets the convex side of a neighboring vane at the rotating body in a smooth, substantially linear transition from the concave side of the one vane to the convex side of the neighboring vane;
        (2) each vane is more narrow at a tip end opposite the rotating body as compared to a root end at the rotating body; and
        (3) an edge portion of each vane, located at the tip end, defines a plane substantially parallel to a plane defined by a tangential surface of the rotating body, the tangential surface being located between the edge portion and the center axis;
    a flow deflector comprising an edge proximate to the rotating body, the flow deflector guiding the water flow into the curved vanes for allowing operation in various water flow speeds ranging from 1 mile per hour ("MPH") to over 20 MPH;
    a first side disc centered at the first side of the rotating body,
    a second side disc oriented parallel to the first side disc and centered at the second side of the rotating body, wherein the first and second side discs each comprise a radius that is greater than a height of each of the three vanes;
    a first electrical generator coupled to the first side disc, and a second electrical generator coupled to the second side disc, wherein the first and second electrical generators convert rotational energy produced by the rotation of the rotating body about the center axis into the electrical energy; and transmitting the electrical energy to power an electrical device.

\* \* \* \* \*